(12) United States Patent
Power et al.

(10) Patent No.: US 12,357,884 B1
(45) Date of Patent: Jul. 15, 2025

(54) METHODS OF JOINING METAL GOLF CLUB COMPONENTS USING SOLID STATE PROCESSES

(71) Applicant: Callaway Golf Company, Carlsbad, CA (US)

(72) Inventors: Alex Power, Carlsbad, CA (US); Irina Ivanova, San Marcos, CA (US); Joshua D. Westrum, San Diego, CA (US)

(73) Assignee: Topgolf Callaway Brands Corp., Carlsbad, CA (US)

( * ) Notice: Subject to any disclaimer, the term of this patent is extended or adjusted under 35 U.S.C. 154(b) by 607 days.

(21) Appl. No.: 17/869,131

(22) Filed: Jul. 20, 2022

Related U.S. Application Data

(60) Provisional application No. 63/224,058, filed on Jul. 21, 2021.

(51) Int. Cl.
*A63B 53/04* (2015.01)
*B23K 20/12* (2006.01)

(52) U.S. Cl.
CPC .......... *A63B 53/047* (2013.01); *A63B 53/042* (2020.08); *B23K 20/12* (2013.01)

(58) Field of Classification Search
None
See application file for complete search history.

(56) References Cited

U.S. PATENT DOCUMENTS

| | | | |
|---|---|---|---|
| 5,669,825 A * | 9/1997 | Shira ..................... | A63B 53/04 473/409 |
| 7,882,996 B2 * | 2/2011 | Alessi ................ | B23K 20/1205 228/2.1 |
| 2002/0187851 A1 * | 12/2002 | Chang .................. | A63B 53/047 473/324 |
| 2007/0265107 A1 * | 11/2007 | Wang ................... | B23K 11/002 473/332 |
| 2018/0209010 A1 * | 7/2018 | Simone .................. | C21D 10/00 |

\* cited by examiner

*Primary Examiner* — Reginald S Tillman, Jr.
(74) *Attorney, Agent, or Firm* — Michael A. Catania

(57) ABSTRACT

Methods of joining dissimilar metal, non-cylindrical golf club components, and particularly golf club bodies and faces, using one or more solid state processes are disclosed herein. One method includes the steps of preparing a first non-cylindrical golf club component made of a first metal material, preparing a second non-cylindrical golf club component made of a second metal material that is different from the first metal material, and affixing the first non-cylindrical golf club component to the second non-cylindrical golf club component along a plane using a solid state joining process. Another method includes the steps of providing a golf club body with a first planar joining surface, providing a golf club face component with a second planar joining surface, and affixing the first planar joining surface to the second planar joining surface via linear friction welding, rotational friction welding, diffusion bonding, or ultrasonic welding.

1 Claim, 2 Drawing Sheets
METHODS OF JOINING METAL GOLF CLUB COMPONENTS USING SOLID STATE PROCESSES

CROSS REFERENCES TO RELATED APPLICATIONS

The present application claims priority to U.S. Provisional Patent Application No. 63/224,058, filed on Jul. 21, 2021, the disclosure of which is hereby incorporated by reference in its entirety herein.

STATEMENT REGARDING FEDERALLY SPONSORED RESEARCH OR DEVELOPMENT

Not Applicable

BACKGROUND OF THE INVENTION

Field of the Invention

The present invention relates to solid state methods of joining metal golf club components, and in particular the use of using solid state attachment techniques to permanently join golf club faces to golf club bodies.

Description of the Related Art

The prior art provides several methods for attaching metal golf club components to one another, and in particular golf club faces to golf club bodies. These include tungsten inert gas (TIG) welding, metal inert gas (MIG) welding, laser welding, and plasma welding. One drawback to these methods is that they melt the parent materials, and are not considered solid state joining processes. When the joined components are made of different alloys, these melting processes create intermetallic compounds while the parent materials are in liquid state. These intermetallic compounds are weaker (e.g., more brittle) than their parent materials. Therefore, there is a need for improved methods of joining non-cylindrical golf components made from dissimilar alloys.

BRIEF SUMMARY OF THE INVENTION

One aspect of the present invention is a method of joining non-cylindrical golf club components made of dissimilar metal materials to one another without creating intermetallic compounds. In some embodiments, a solid-state joining method is employed. The solid-state joining method may be selected from the group consisting of linear friction welding, rotational friction welding, diffusion bonding, and ultrasonic welding.

Another aspect of the present invention is a method of joining non-cylindrical golf club components made of dissimilar metal alloys to one another using linear friction welding.

Yet another aspect of the present invention is a method comprising the steps of preparing a first non-cylindrical golf club component comprising a first metal material, preparing a second non-cylindrical golf club component comprising a second metal material that is different from the first metal material, and affixing the first non-cylindrical golf club component to the second non-cylindrical golf club component along a plane via a solid state joining process which may be selected from the group consisting of linear friction welding, rotational friction welding, diffusion bonding, and ultrasonic welding. In some embodiments, the solid state joining process may include the steps of applying force along a front-to-back axis and oscillating along a top-to-bottom axis. In a further embodiment, the method may include the step of applying an interlayer material between the first non-cylindrical golf club component and the second non-cylindrical golf club component before the step of affixing the first non-cylindrical golf club component to the second non-cylindrical golf club component.

In any embodiment, one of the first and second materials (but not both) may be selected from the group consisting of 17-4 stainless steel, 304 stainless steel, 304L stainless steel, 321 stainless steel, 303 stainless steel, 316 stainless steel, 316L stainless steel, 420 stainless steel, 425 stainless steel, 425M stainless steel, 450 stainless steel, 455 stainless steel, 475 stainless steel, and HSR300 stainless steel. In another embodiment, one of the first and second metal materials (but not both) may be selected from the group consisting of 6061 aluminum, 6063 aluminum, and 7075 aluminum. In yet another embodiment, one of the first and second metal materials (but not both) may be selected from the group consisting of 6-4 titanium, 811 titanium, FS2S titanium, FS2S+ titanium, SP700 titanium, Ti 17, Ti 21, and 15-3-3-3 titanium. In yet another embodiment, one of the first and second metal materials (but not both) may be selected from the group consisting of C300 maraging steel, 1020 steel, 1025 steel, 1045 steel, 4130 steel, 4140 steel, and 4340 steel. In another embodiment, one of the first and second metal materials (but not both) may be tungsten alloy having a density of 10 g/cc to 18 g/cc.

In other embodiments, the first non-cylindrical golf club component may be selected from the group consisting of a weight component, a secondary variable face thickness component, a stiffening component, and a strengthening component, and the second non-cylindrical golf club component may be a face component, which may be selected from the group consisting of a face insert, a face plate, and a face cup. In yet another embodiment, the first non-cylindrical golf club component may be selected from the group consisting of a weight component, a stiffening component, and a strengthening component, and the second non-cylindrical golf club component may be a body component, which may be selected from the group consisting of a hollow body, a solid body, and a body having at least one cavity. In a further embodiment, the body may be composed of at least one piece.

Another aspect of the present invention is a method comprising the steps of providing a golf club body with a first planar joining surface, providing a golf club face component with a second planar joining surface, and affixing the first planar joining surface to the second planar joining surface via a solid state joining process selected from the group consisting of linear friction welding, rotational friction welding, diffusion bonding, and ultrasonic welding, wherein the golf club body is composed of a first metal alloy, and wherein the golf club face component is composed of a second metal alloy that is different from the first metal alloy.

In some embodiments, the step of affixing the first planar joining surface to the second planar joining surface may comprise the creation of a solid state joint that does not comprise any intermetallic compounds. In a further embodiment, the method may include the step of applying an interlayer material between the first planar joining surface and the second planar joining surface, which interlayer material may be composed of a third metal alloy that is different from the first metal alloy and the second metal alloy. In another embodiment, the golf club body may be an iron-type golf club body, and wherein the golf club face component may be a face cup.

In other embodiments, one of the first and second metal alloy (but not both) may be selected from the group consisting of 17-4 stainless steel, 304 stainless steel, 304L stainless steel, 321 stainless steel, 303 stainless steel, 316 stainless steel, 316L stainless steel, 420 stainless steel, 425 stainless steel, 425M stainless steel, 450 stainless steel, 455 stainless steel, 475 stainless steel, and HSR300 stainless steel. In still other embodiments, one of the first and second metal alloy (but not both) may be selected from the group consisting of 6061 aluminum, 6063 aluminum, and 7075 aluminum. In other embodiments, one of the first and second metal alloy (but not both) may be selected from the group consisting of 6-4 titanium, 811 titanium, FS2S titanium, FS2S+ titanium, SP700 titanium, Ti 17, Ti 21, and 15-3-3-3 titanium. In other embodiments, one of the first and second metal alloy (but not both) may be selected from the group consisting of C300 maraging steel, 1020 steel, 1025 steel, 1045 steel, 4130 steel, 4140 steel, and 4340 steel. In other embodiments, one of the first and second metal alloy (but not both) may be selected from a tungsten alloy having a density of 10 g/cc to 18 g/cc.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

The present invention is a method 100 of affixing non-cylindrical golf club components made of dissimilar metals to one another using one or more solid state joining processes, such as linear friction welding, rotational friction welding, diffusion bonding, and ultrasonic welding. Combinations of dissimilar metal materials include, for example, stainless steel to titanium, steel to titanium, stainless steel to aluminum, steel to aluminum, aluminum to titanium, tungsten to titanium, tungsten to stainless steel, and tungsten to steel. In these combinations, the stainless steel may be 17-4, 304, 304L, 321, 303, 316, 316L, 420, 425, 425M, 450, 455, 475, or HSR300, the aluminum may be 6061, 6063, or 7075, the titanium may be 6-4, 811, FS2S, FS2S+, SP700, Ti 17, Ti 21, 15-3-3-3, the steel may be C300 maraging steel, 1020, 1025, 1045, 4130, 4140, 4340, and the tungsten may have a density of 10 g/cc to 18 g/cc.

Figure 1:
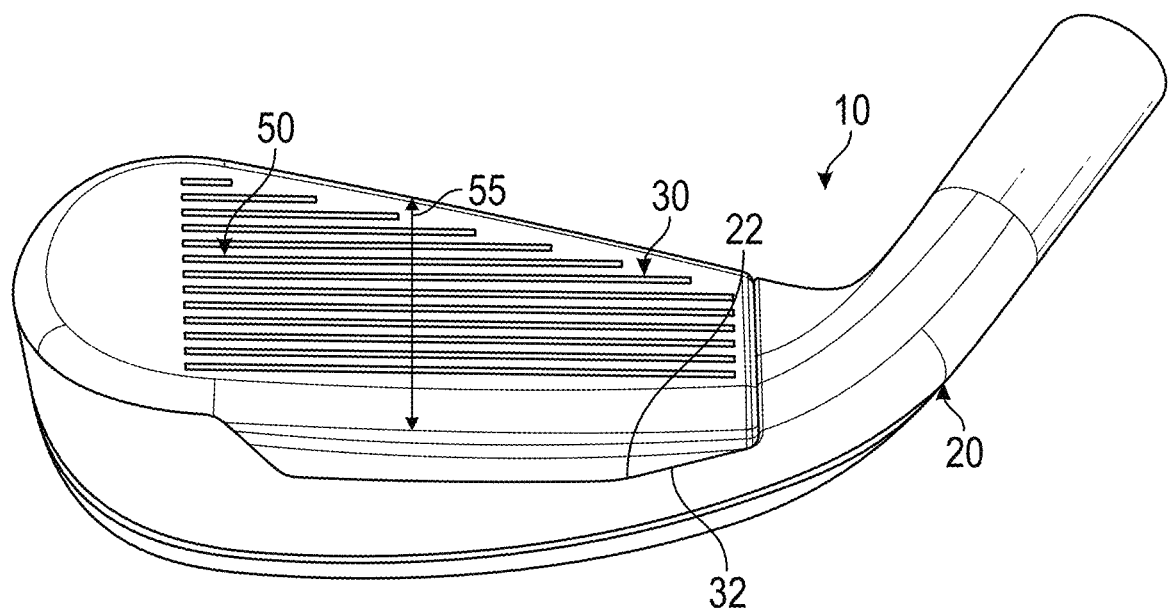
FIGS. 1 and 2 are front perspective views of a golf club head manufactured using methods of the present invention.
Figure 2:
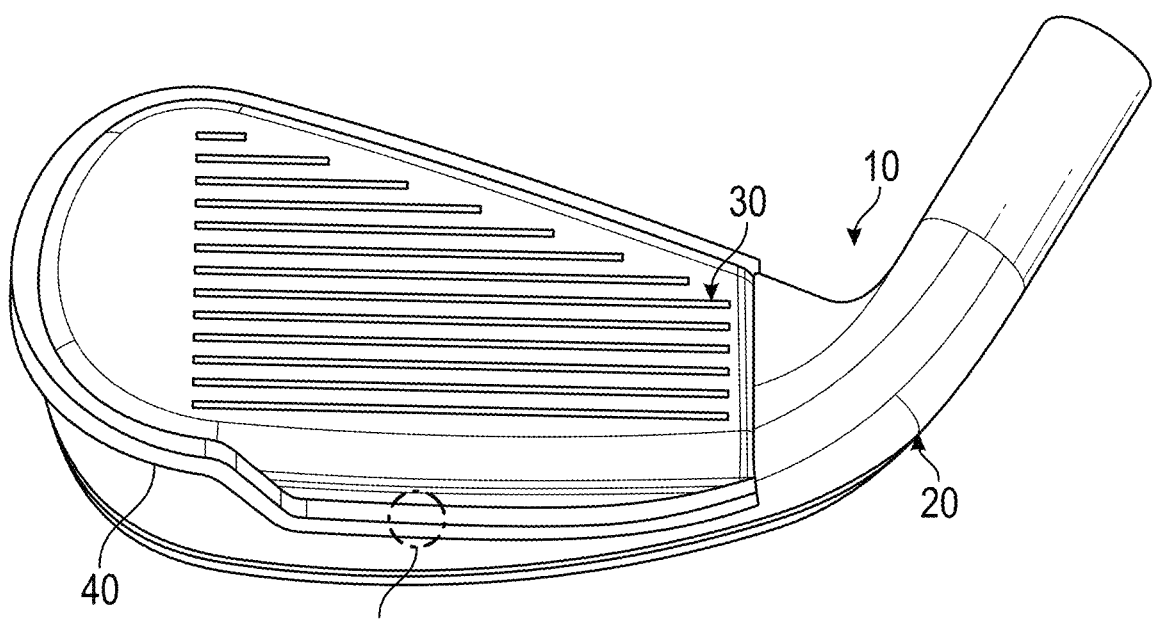

In a preferred embodiment, this method 100 is used to affix the body component 20 to the face component 30 to create the iron-type golf club head 10 shown in FIGS. 1 and 2, though in other embodiments the components may be for other types of golf club heads, such as drivers, fairway woods, wedges, and putters. In still other embodiments, the method described herein may be used to join a weight component to a body component or a face component, a secondary variable face thickness component to a face component, a different density material to the face component or body component, a stiffening component to the face component or body component, or a strengthening component to the face component or body component. In any embodiment, the face component may be a face insert, face plate, or a face cup, the body may be a hollow body, open cavity body, or solid body, and the body may be made of one or more pieces.

Figure 3:
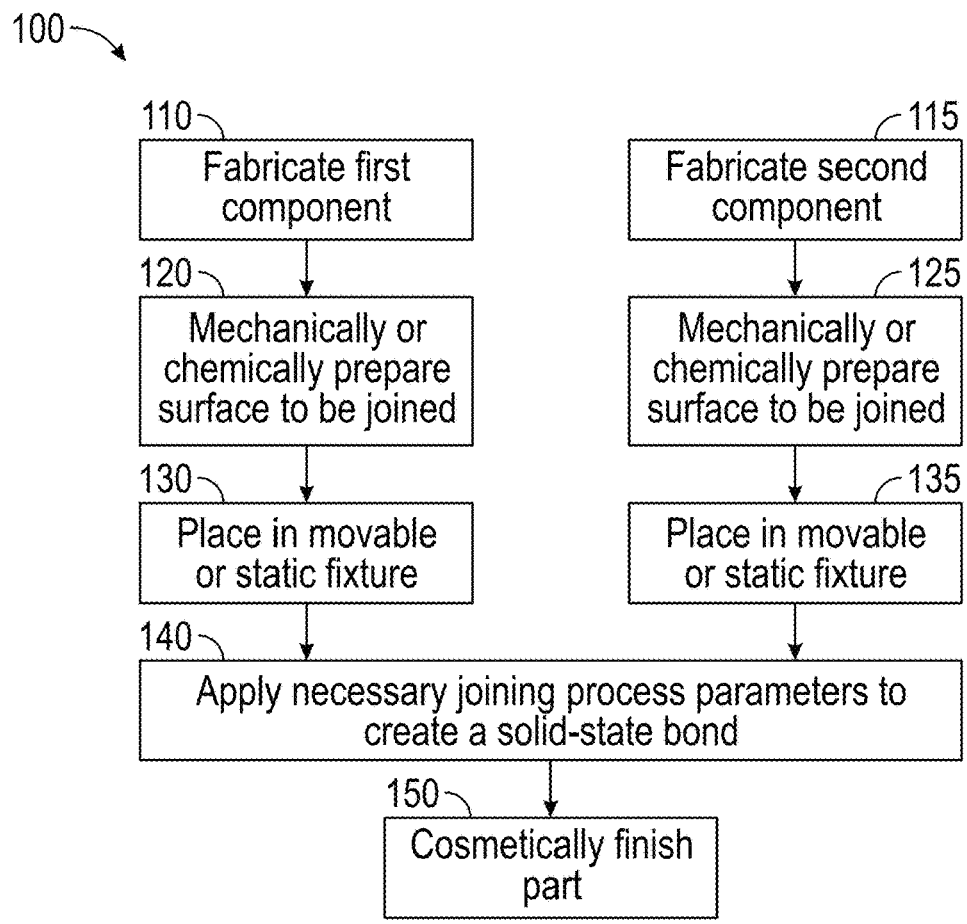
FIG. 3 is a process flow chart describing a method of the present invention.

As illustrated in FIG. 3, the first step 110 of the method 100 comprises fabricating a first component (such as the body component 20) and the second step 115 comprises fabricating a second component (such as the face component 30). These steps 110, 115 may be performed simultaneously using any method known to a person skilled in the art. In third and fourth steps 120, 125, joining surfaces 22, 32 of the first and second components (e.g., body and face components 20, 30) are mechanically or chemically prepared for the joining process, and in fifth and sixth steps 130, 135, the first and second components (e.g., body and face components 20, 30) are placed in one or more fixtures, which may be movable or static. In a seventh step 140, the joining surfaces 22, 32 are affixed to one another using a solid state joining process to create a combination part with a solid state bond at the joint 40. In this method, the solid state joining process is preferably linear friction welding, though it other embodiments it may be as rotational friction welding, diffusion bonding, or ultrasonic welding. The front-to-back axis 50 along which force is applied to the two components 20, 30 is illustrated in FIG. 1, as is the top-to-bottom axis 55 along which the components oscillate during the joining process. In a final, eighth step 150, the combination part is cosmetically finished.

Figure 4:
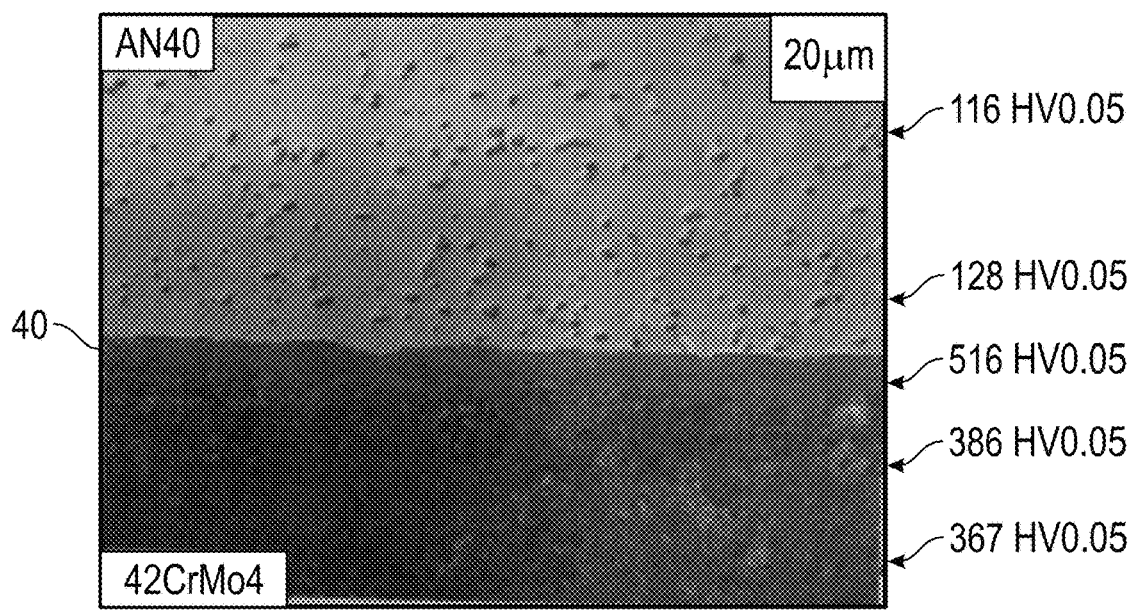
FIG. 4 is a micrograph of the circled region of FIG. 2.

When joined using this method, the resulting joint 40 between the first and second components (e.g., body and face components 20, 30) does not comprise any intermetallic compounds. A close-up cross section of the joint 40 is shown in FIG. 4. This is because the metal materials of the body and face components 20, 30 are in their solid forms, and thus below the formation temperature for intermetallic compounds, when they are joined. In some embodiments, an interlayer can be added between the joining surfaces 22, 32 of the body and face components 20, 30 to increase joint 40 strength.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications, combinations, and substitutions of equivalents may be made therein without departing from the spirit and scope of this invention which is intended to be unlimited by the foregoing except as may appear in the following appended claims. The section titles included herein also are not intended to be limiting. Therefore, the embodiments of the invention in which an exclusive property or privilege is claimed are defined in the following appended claims.

We claim:

1. A method comprising the steps of:
   preparing a first non-cylindrical golf club component comprising a first metal material;
   preparing a second non-cylindrical golf club component comprising a second metal material that is different from the first metal material; and
   affixing the first non-cylindrical golf club component to the second non-cylindrical golf club component along a plane via a rotational friction welding, wherein a resulting joint between the first non-cylindrical component and the second non-cylindrical golf club component has an absence of intermetallic compounds.

\* \* \* \* \*